(12) United States Patent
Goswami et al.

(10) Patent No.: US 12,423,061 B2
(45) Date of Patent: Sep. 23, 2025

(54) HIERARCHICAL SOFTWARE PROCESSING USING FEDERATED NODES

(71) Applicant: Bank of America Corporation, Charlotte, NC (US)

(72) Inventors: Debraj Goswami, Telangana (IN); Srikanth Janardhan Rao, Telangana (IN); Kiran Pulla, Telangana (IN)

(73) Assignee: Bank of America Corporation, Charlotte, NC (US)

( * ) Notice: Subject to any disclaimer, the term of this patent is extended or adjusted under 35 U.S.C. 154(b) by 188 days.

(21) Appl. No.: 18/113,112

(22) Filed: Feb. 23, 2023

(65) Prior Publication Data

US 2024/0289097 A1 Aug. 29, 2024

(51) Int. Cl.
*G06F 8/77* (2018.01)
*G06F 8/20* (2018.01)

(52) U.S. Cl.
CPC . *G06F 8/24* (2013.01); *G06F 8/77* (2013.01)

(58) Field of Classification Search
CPC .................................. G06F 8/24; G06F 8/77
See application file for complete search history.

(56) References Cited

U.S. PATENT DOCUMENTS

| | | | |
|---|---|---|---|
| 7,433,887 B2 * | 10/2008 | Thakkar | G06Q 10/10 |
| 10,419,570 B2 * | 9/2019 | Yadav | H04L 9/40 |
| 11,334,370 B2 * | 5/2022 | Kruempelmann | G06F 9/44505 |
| 11,593,096 B1 * | 2/2023 | Chaptini | G06F 8/77 |
| 11,604,836 B1 * | 3/2023 | Chapman | G06N 20/00 |
| 11,899,559 B1 * | 2/2024 | Sanders | H04L 63/1433 |
| 2006/0143193 A1 * | 6/2006 | Thakkar | G06Q 10/10 |
| 2007/0055965 A1 * | 3/2007 | Colyer | G06F 8/316 |
| | | | 717/163 |
| 2007/0094675 A1 * | 4/2007 | Ryan | G06F 9/548 |
| | | | 719/330 |
| 2009/0049422 A1 * | 2/2009 | Hage | G06F 8/10 |
| | | | 717/104 |
| 2010/0031090 A1 * | 2/2010 | Bernardini | G06F 11/366 |
| | | | 714/E11.002 |
| 2014/0059385 A1 * | 2/2014 | Dolinsky | H04L 41/0856 |
| | | | 714/33 |
| 2014/0282369 A1 * | 9/2014 | Pressley | G06F 8/34 |
| | | | 717/105 |
| 2015/0160814 A1 * | 6/2015 | Hermanns | G06F 8/22 |
| | | | 715/764 |
| 2017/0269913 A1 * | 9/2017 | Meijer | G06F 8/24 |

(Continued)

*Primary Examiner* — Daxin Wu
(74) *Attorney, Agent, or Firm* — Weiss & Arons LLP

(57) ABSTRACT

An architecture for writing software programs is provided. The architecture allows programmers to focus on writing software and shifts definition of entities, creation of processing rules and business logic to a special visual programming language. The special visual programming language onscreen visual cues for use by personnel without technical programming expertise. The special visual programming language may be utilized to define an entity. The defined entities may be utilized by programmers to create products that are governed by the definitions of the constituent entities included in each product. The architecture also includes a Universal Central Engine that processes products created by the programmers, identifies the constituent entities included in each product and processes those constituent entities in accordance with their definitions.

17 Claims, 5 Drawing Sheets

(56) References Cited

U.S. PATENT DOCUMENTS

| | | | |
|---|---|---|---|
| 2018/0240051 A1* | 8/2018 | Chen | G06Q 10/0633 |
| 2019/0205125 A1* | 7/2019 | van Schaik | G06F 8/751 |
| 2020/0272434 A1* | 8/2020 | Klemenz | G06F 8/41 |
| 2021/0397447 A1* | 12/2021 | Crabtree | G06Q 20/065 |
| 2022/0043842 A1* | 2/2022 | Saraf | H04L 63/0807 |
| 2023/0018159 A1* | 1/2023 | Barroso | G06F 8/35 |
| 2023/0018598 A1* | 1/2023 | zhang | H04L 43/0817 |

* cited by examiner

_US 12,423,061 B2_

HIERARCHICAL SOFTWARE PROCESSING USING FEDERATED NODES

FIELD OF TECHNOLOGY

Aspects of the disclosure relate to automating development of software programs.

BACKGROUND OF THE DISCLOSURE

Computer systems play an integral role in the operations of nearly every enterprise across the globe. Large or small, enterprises rely on computer systems at all phases of their workflows. From communications and tracking to processing and record keeping, computer systems are the backbone of modern enterprises. Computer systems allow enterprises to provide access to information and services.

However, computer systems require software which provides instructions on how to operate and which actions to perform. Exemplary modern software applications include productivity tools, graphics software, databases and database management programs, web browsers, word processors, image editors and communication platforms.

Creation of software using conventional processes typically requires teams of human programmers to write, test, debug and deploy software. The programmers themselves may use software tools to create software. For example, programmers typically use assemblers, compilers, debuggers and interpreters.

The conventional software development process includes multiple phases. During a design phase, the programmers assess the needs of users or systems that will utilize the software. Based on data gathered during the design phase, the programmers generate functional requirements for the software. The functional requirements outline how the software will operate and meet the design needs of the user or systems.

During a development phase, the software is written and tested by programmers. During a deployment phase, the software is installed on computer systems and deployed to solve the business needs identified during the design phase. Finally, during a maintenance phase, programmers continue to monitor the evolving business needs of users or systems utilizing the software. As those business needs evolve, the programmers upgrade the software to meet the current business needs. The ability of programmers to successfully maintain software effectively may define how long the software remains deployed on computer systems. The maintenance phase may include fixing later discovered bugs and adjusting software code to operate on newly released hardware.

In addition to the herculean human effort needed to create software using the conventional process outlined above, the conventional process has additional drawbacks. In the conventional software development process, the programmers writing software do not have expertise in how to operate the business unit commissioning the software. Thus, the programmers may not have a deep understanding of the business problems a software application is meant to solve. This knowledge gap between technical expertise of the programmers writing the software and a deep understanding of the business problem the software is supposed to solve may result in software that does not meet the needs or expectations of the business unit.

The knowledge gap may lead to misaligned expectations of what the software is supposed to accomplish, delay release of new software and lead to cost overruns. Additionally, the needs of the business unit may change after software is successfully deployed. The subsequent misalignment of software functionality with current business goals may require time consuming maintenance work to adapt the software to the current goals. As the needs of the business unit change, intensive maintenance work and upgrades may result in higher chances of software failure because the high number of changes the increases risk of incompatible or inconsistent changes to the software.

It would be desirable to provide apparatus and methods for creating software that reduce human resources needed to create a software application. It would further be desirable to provide apparatus and methods that implement an alternative way of writing software that allows programmers to utilize their expertise in writing software without deep knowledge of a business unit's operational needs. It is also desirable to reduce overall software development time and software development costs. It would further be desirable to create software that has a long lifecycle and low cost of maintenance and operation. It is therefore desirable to provide apparatus and methods for HIERARCHICAL SOFTWARE PROCESSING USING FEDERATED NODES.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
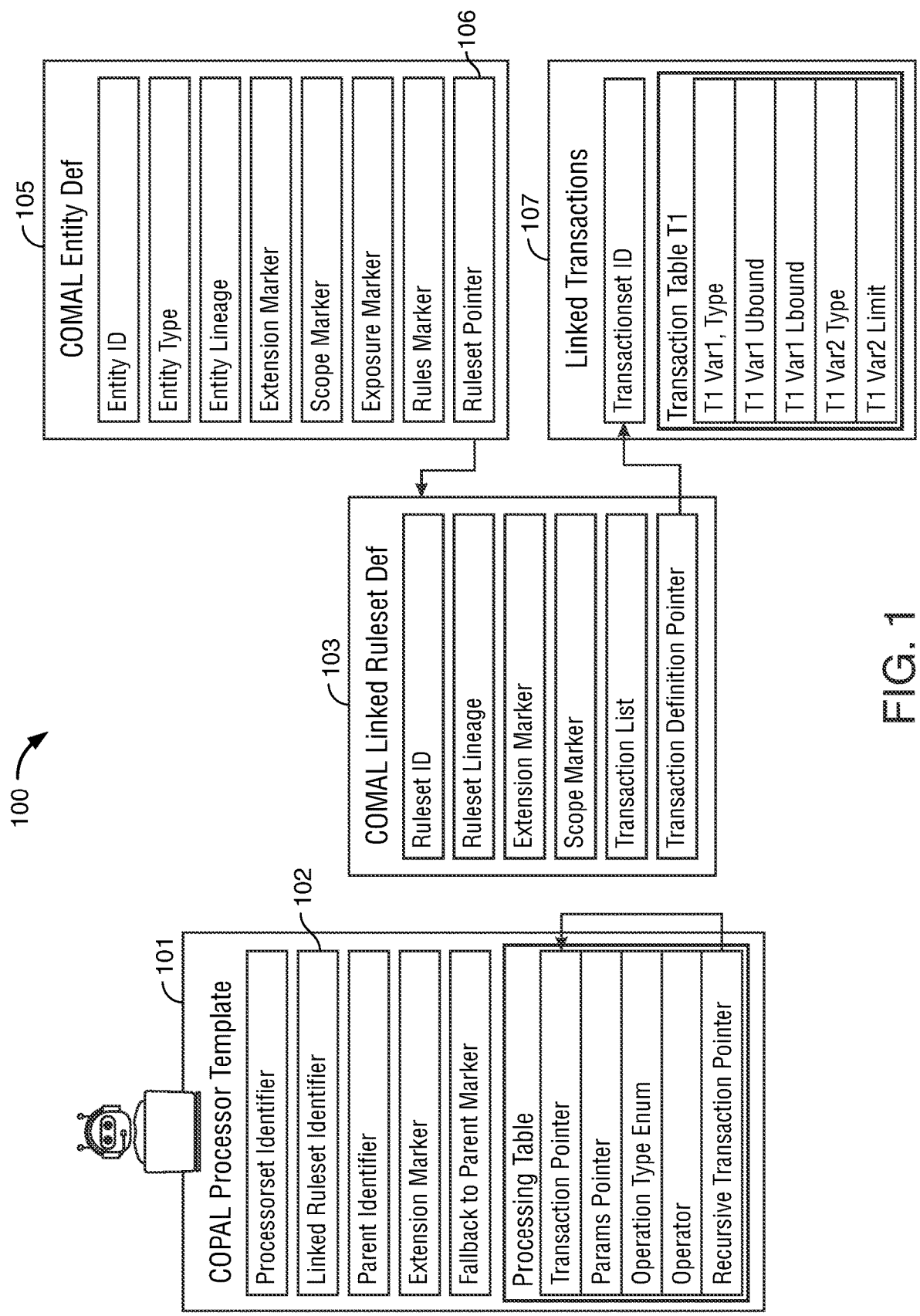
FIG. 1 shows an illustrative process flow in accordance with principles of the disclosure.

A system architecture for generating a computer program is provided. The architecture may include one or more computer servers. A computer server may include a processor circuit. The processor circuit may control the overall operation of a computer server. A processor circuit may include hardware, such as one or more integrated circuits that form a chipset. The hardware may include digital or analog logic circuitry configured to perform any suitable (e.g., logical) operation.

The computer server may include one or more of the following hardware components: I/O circuitry, which may include a transmitter device and a receiver device and may interface with fiber optic cable, coaxial cable, telephone lines, wireless devices, physical network layer hardware, a keypad/display control device or any other suitable encoded media or devices; peripheral devices, which may include counter timers, real-time timers, power-on reset generators or any other suitable peripheral devices; a logical processing device, which may compute data structural information, structural parameters of the data, quantify indices; and machine-readable memory.

The computer server may include RAM, ROM, an input/output ("I/O") module and a non-transitory or non-volatile memory. Machine-readable memory may be configured to store information in machine-readable data structures. The I/O module may include a microphone, button and/or touch screen which may accept user-provided input. The I/O module may include one or more of a speaker for providing audio output and a video display for providing textual, audiovisual and/or graphical output.

Software applications executed by the computer server may be stored within the non-transitory memory and/or other storage medium. Software applications may provide instructions to the processor that enable the computing system to perform various functions. For example, the non-transitory memory may store software applications such as an operating system, application programs, machine learning algorithms and an associated database. Alternatively, some or all of computer executable instructions of a software application may be embodied in hardware or firmware components of a computer server.

Software applications may include computer executable instructions for invoking user functionality related to communication, such as email, short message service ("SMS"), and voice input and speech recognition applications. Software applications may utilize one or more algorithms that process received executable instructions, perform power management routines or other suitable tasks.

Software applications may utilize computer-executable instructions, such as program modules, executed by a processor. Generally, program modules include routines, programs, objects, components, data structures, etc. that perform particular tasks or implement particular abstract data types. The computer server may be operational with distributed computing environments where tasks are performed by remote processing devices that are linked through a communications network. In a distributed computing environment, program modules may be located in both local and remote computer storage media including memory storage devices. The computer server may rely on a network of remote servers hosted on the Internet to store, manage, and process data (e.g., "cloud computing" and/or "fog computing").

Software applications may be written using a programming language. A programming language provides a syntax for programmers to instruct and communicate with a computer server or other computer system. A programming language may be text or graphics based. The programming language may translate text entered or graphics elements selected by a programmer into machine instructions that are processed by a computer server to implement a desired task or functionality.

Programming languages utilized by the present invention may be written in an object oriented, scripted or unscripted programming language such as JAVA, PERL, SMALLTALK, C++ or the like. However, the computer program code/computer-readable instructions for carrying out operations of the invention may also be written in conventional procedural programming languages, such as the "C" programming language or similar programming languages.

Computer executable instructions generated by a programming language may direct a computer server or other programmable data processing apparatus to function in a particular manner. For example, computer executable instructions may be stored in a non-transitory memory and executed by a processor of the computer server to implement any function described herein.

The computer server may be part of two or more networks. The computer server may support establishing network connections to one or more remote computing systems. Illustrative network connections may include a local area network ("LAN") and a wide area network ("WAN"). When used in a LAN networking environment, a computer server may be connected to the LAN through a network interface or adapter. The computer server may include a communication circuit. The communication circuit may include a network interface card or adapter.

When used in a WAN networking environment, the computer server may include a modem, antenna or other circuitry for establishing communications over a WAN, such as the Internet. The communication circuit may include a modem and/or antenna. The existence of any of various well-known protocols such as TCP/IP, Ethernet, FTP, HTTP and the like is presumed, and a computing system may be operated in a client-server configuration to permit a user to retrieve web pages from a web-based server. Web browsers can be used to display and manipulate data on web pages.

The computer server may include components, such as a display, battery, speaker, and antennas. Components of the computer server may be linked by a system bus, wirelessly or by other suitable interconnections. Components of the computer server may be present on one or more circuit boards. In some embodiments, the components may be integrated into a single chip. The chip may be silicon-based.

The architecture may include a library of entities. The library may be stored on non-transitory media of the computer server. An entity may be any physical object, digital object, infrastructure elements, processes, or human resources. Each entity in the library may be defined using a compliance objects metadata annotation language ("COMAL"). The COMAL may be a computer programming language.

The COMAL may be designed to be utilized by people without conventional computer programming skills such as business unit experts (e.g., human resources, sales, product, or legal department employees). To enable use of COMAL by business unit experts without programming skills, the COMAL may be designed to present onscreen visual cues. The visual cues may be arranged in a way that defines a target entity. The visual cues may be arranged in a way that creates processing rules and business logic for the target entity. Based on the arrangement of the visual cues, other underlying software programs may issue function calls to create and define the target entity.

Designing COMAL so that it is usable by non-technical business unit experts may shift the initial definition of entities to business experts. Thus, the business unit experts who understand the overall goal and strategy desired for a software application may utilize COMAL to define the rules and logic for each entity that will be available to functional calls of a software application. Programmers will not need to understand or define cumbersome business logic and rules. Instead, the programmers can focus on writing software that will automate interaction of the COMAL defined entities.

The architecture may include an aggregating engine. The aggregating engine may execute a compliance objects processing and analysis language ("COPAL"). The COPAL may be programmed to synthesize a product. The COPAL may synthesize the product based on two or more COMAL defined entities. For example, a first entity may be an "employee." A COMAL definition of the employee entity may include a number of vacation days and whether those are paid or unpaid days. A second entity may be "vacation." The COMAL definition of vacation may include dates when the vacation may be utilized, duration of the vacation and whether the vacation is paid or unpaid. A COPAL created product may associate the COMAL entity with the COMAL employee entity. Thus, an exemplary COPAL product may be an employee-vacation product.

The COPAL product may be used to automate determination of when and how an employee entity can use vacation. Because the employee and vacation entities have been defined using COMAL by business unit experts (e.g., a company's human resources department), programmers are free to write software that allows employees to schedule when they are taking vacation. The programmer can focus on functionality and usability of the desired software without concern for the specific business rules and logic that define when a specific employee is allowed to take vacation.

The architecture may include a universal central engine ("UCE"). The UCE may process a COPAL product based on at least one target data parameter received for each COMAL entity synthesized in the product. A data parameter may be a value or other input that can be tested for compliance with a definition of a COMAL entity. A data parameter may itself be a COMAL entity.

For example, in the vacation scheduler described above, the data parameter may be a desired vacation date. The UCE may determine whether the employee can utilize vacation days during the dates input by the employee entity. For an employee-vacation product, the UCE may examine the rules associated with COMAL defined vacation entity with respect to the associated COMAL defined employee entity. The UCE may apply a processing hierarchy for determining whether, for a given data parameter, to first process definitions of the employee entity or the vacation entity. The product itself may define the processing hierarchy.

The UCE may include a plurality of nodes. Each of the nodes may process a COMAL entity. Each node may be configured to enforce definitions of the COMAL entity with respect to a data parameter that is bound to an entity. A data parameter may be "bound" to an entity when a product that includes the entities is utilized in a live environment. For example, for the employee-vacation product described above, a data parameter may be bound to the product when a request for a specific employee submits a request for specific vacation days. The data parameters may include identification of the employee submitting the request and the date and date range for the requested vacation time.

As a further example, an illustrative product may be a credit card transaction. The product may include a card entity, a customer entity and a merchant entity. The product may be bound to a data parameter when the customer uses a credit card to pay for a purchase at a merchant. The data parameters may include identification of the specific customer, the specific card, the amount of the transaction and the identification of the merchant.

The nodes may be nested. The nested nodes may process data parameters hierarchically. For example, if the product is a credit card transaction, the nodes may first determine whether the customer is eligible to charge the associated credit card the purchase amount. Another node may then determine whether the associated credit card has been flagged in connection with suspicious transaction activity. If the node determines that the specific credit card in question has been associated with suspicious transaction activity, the node may terminate the processing of the product without approving the purchase amount.

The architecture may advantageously be easily adapted to new business realities. For example, in response to a change in business policy or rules, the business unit experts may use COMAL to change an entity definition. The change to the entity definition may not require any change to products that have been created by programmers. The entities included in a programmer product, when bound to a data parameter, will be processed by a node responsible for enforcing the definition of a given COMAL entity. At a time the node processes the COMAL entity, the node will utilize the then current definition of the entity. The current definition will reflect the latest business strategy a rules implemented by the business unit experts.

For example, in the context of a credit card transaction product, business unit experts may dynamically change a COMAL definition such as of suspicious activity that would terminate processing of a COPAL credit card product. The dynamic change to the COMAL definition of suspicious activity would not require any changes to the COPAL credit card product or any other COPAL product that utilizes the COMAL definition of suspicious activity. After a data parameter is bound to the COPAL credit card product, the nodes that process the underlying COMAL entities included in the COPAL credit card product will utilize the latest definitions for each COMAL entity. Likewise, a change to any COMAL entity definition will be applied to any COPAL product that includes the redefined COMAL entity.

The plurality of nodes included in the UCE may include higher-level nodes and lower-level nodes. A higher-level node may process a first COMAL entity before a lower-level node processes a second COMAL entity. The higher-level node may determine which lower-level node processes the second COMAL entity. For example, after binding to a data parameter, all COPAL products may be submitted to the UCE for processing. However, some COPAL products may be entitled to higher priority processing by the UCE. Within a COPAL product, COMAL entities may be entitled to different processing priorities.

A higher priority processing may mandate that a processing node is allocated by the UCE to determine whether a data parameter is defined for a COMAL entity. A failure of the higher-level nodes to successfully process a COMAL entity of a product may abort any further processing of other COMAL entities associated with a COPAL product.

Each COMAL entity may be linked to or assigned a target identifier. The target identifier may be associated with a library that includes multiple COMAL entities. The library may store COMAL entities that are associated with a specific business unit or other operational entity. The library may store COMAL entities that have all been defined by a target group of business unit experts. The definition of each COMAL entity in a library may prevent a synthesis of a COPAL product using a foreign COMAL entity that does not include the target identifier.

For example, within an organization, a group of legal experts may define COMAL entities that are stored in a library. Because of the specialized nature and limited use cases for COMAL entities defined by the legal group, any COMAL entity included in the "legal" library may not be synthesized with a COMAL entity defined by a different group of business unit experts.

In some embodiments, a library of COMAL entities may be shared among different groups of business unit experts.

For example, a first COPAL product may be associated with a first plurality of COMAL entities. A second COPAL product is associated with a second plurality of COMAL entities. A third COPAL product may be created by synthesizing the first COPAL product and the second COPAL product.

The third COPAL product may be submitted to the UCE for processing. The UCE may split or skin the third COPAL product into its constituent first and second COPAL products. The first COPAL product (and its constituent COMAL entities) may be processed by a first group of nodes. The second COPAL product (and its constituent COMAL entities) may be processed by a second group of nodes. Utilizing the COMAL and COPAL architecture, the third COPAL product may be processed faster than using conventional methods for executing software applications. Before starting to process a COPAL product, the COMAL and COPAL architecture may split the COPAL product into its constituent COPAL and COMAL entities, which facilities faster parallel processing.

For example, a COPAL product corresponding to a purchase transaction may include a combination of a credit card COPAL product, a point-of-sale ("POS") terminal COPAL product and a transaction COPAL product. The credit card COPAL product may include COMAL entities that define a credit limit for a target customer, an issuer associated with the credit card and various fraud protections in place for the customer. The POS terminal COPAL product may include COMAL entities that define an acquirer of a merchant that operates the POS terminal and a daily processing limit of the merchant. The transaction COPAL product may include COMAL entities that define an interchange fee imposed on the merchant and criteria for approving a purchase. Each of these three COPAL products may be processed in parallel by nodes of the UCE. Processing the COPAL products in parallel may allow the third COPAL product to be processed (e.g., generate an approval or denial of the transaction) in less time compared to conventional software applications.

A method for building and executing software applications is provided. The methods may include extracting machine-readable instructions from a non-transitory memory and executing the machine-readable instructions on a processor of a computer server. The machine-readable instructions, when executed by the processor may implement one or more functions of the method.

The method may include using a compliance objects metadata annotation language ("COMAL") defining a first COMAL entity and a second COMAL entity. Methods may include executing a Compliance Objects Processing and Analysis Language ("COPAL") and synthesizing a COPAL product based on the first COMAL entity and the second COMAL entity. Methods may include synthesizing the COPAL product after the first COMAL entity is associated with the first data parameter and after the second COMAL entity is associated with the second data parameter.

Methods may include receiving a first data parameter associated with the first COMAL entity. Methods may include receiving a second data parameter associated with the second COMAL entity. Methods may include processing the COPAL product by applying, in parallel, the first data parameter to the first COMAL entity and the second data parameter to the second COMAL entity.

Methods may include processing the COPAL product in parallel by detecting the first COMAL entity and the second COMAL entity in the COPAL product. The UCE may detect the first and second COMAL products. Methods may include assigning the first COMAL entity to a first processing node. Methods may include assigning the second COMAL entity to a second processing node. The first and second processing nodes may be included in the UCE.

The methods may include processing the COPAL product in parallel by detecting a first COMAL sub-entity embedded in the first COMAL entity and a second COMAL sub-entity embedded in the first COMAL entity. Methods may include using the first processing node, processing the first COMAL sub-entity using a first sub-node and processing the second COMAL sub-entity using a second sub-node.

Methods may include changing the definition of the first COMAL entity after the synthesizing. Methods may include processing the COPAL product by applying the changed definition of the first COMAL entity. The COPAL product may be processed using the changed definition of the first COMAL entity without making any change to a structure of the COPAL product. Thus, methods may allow business unit experts to change COMAL definitions without impacting computer code written to define a COPAL product. Likewise, programmers can change a COPAL product without requiring input from business unit experts on how the change will impact COMAL definitions.

A system architecture for processing computer code is provided. The architecture may include a computer server comprising machine executable instructions. The machine executable instructions, when executed by a processor on the computer server or other computer system may implement one or more functions of the architecture.

The architecture may include a compliance objects metadata annotation language ("COMAL"). COMAL may be a visual or graphic programming language. COMAL may be designed with a user experience ("UX") and a user interface ("UI") for use by business unit experts without technical computer programming experience. COMAL may be used by the business unit expert to define entities. A COMAL entity may define human resources, products (physical or digital), company policies, services, company assets or any suitable person place or thing.

The architecture may include an aggregating engine. The aggregating engine may include a computer server comprising machine executable instructions. The machine executable instructions, when executed by a processor on the computer server or other computer system may implement one or more functions of the aggregating engine. The machine executable instructions may include a compliance objects processing and analysis language ("COPAL"). The COPAL may synthesize a product based on two or more COMAL entities. A programmer may utilize COPAL to use COMAL entity building blocks to construct a product or computer program to perform a desired function.

The architecture may include a universal central engine ("UCE"). The UCE may include a computer server comprising machine executable instructions. The computer executable instructions, that when executed by a processor on the computer system may receive a COPAL product. The received COPAL product may be bound to a first data parameter and a second data parameter.

The first and second data parameters may be analogous to input values submitted to a computer program. The architecture may include a transaction application manager. The transaction application manager may be a software program that captures a data parameter and binds the data parameter to a COMAL entity. The architecture may include multiple instances of the transaction application manager. Each instance of the transaction application manager may capture a different data parameter.

In an illustrative scenario, a COPAL product may be a mortgage application. The COPAL product may include an applicant (a first COMAL entity) and the first data parameter may be the applicant's credit score. The COPAL product may also include a property (second COMAL entity) that will be subject to the mortgage. The second COMAL entity may be associated with a market value (second data parameter).

In response to receiving the COPAL product, the aggregating engine may split the COPAL product (e.g., mortgage application) into the first COMAL entity (e.g., applicant)

and the second COMAL entity (e.g., property). The aggregating engine may assign a first node to process the first data parameter (e.g., credit score) in connection with the first COMAL entity.

For example, the first processing node may determine whether, based on the credit score, to allow the mortgage application to proceed. The first processing node may also consider the second data parameter (e.g., market value of property) in conjunction with the credit score.

The aggregating engine may assign a second node to process the second data parameter (e.g., market value of property) in connection with the second COMAL entity. For example, the second processing node may determine whether the requested mortgage is reasonable given the market value of the property. The second processing node may also consider the first data parameter (e.g., credit score) in conjunction with the market value of the property.

The UCE may include a plurality of nodes. The UCE may include a hierarchy control application. The hierarchy control application may coordinate assignment of the first node to the first COMAL entity and the second node to the second COMAL entity. The hierarchy control application may assign processing nodes based on any suitable criterion. For example, the hierarchy control application may assign a processing node to a COMAL entity parsed by the UCE based on a real-time workload of other processing nodes in the plurality. The hierarchy control application may provide a load balancing function to the UCE.

The hierarchy control application may be configured to assign a first node to the first COMAL entity based on the definition of the first COMAL entity. For example, the definition of the first COMAL entity may give the first COMAL entity processing priority over the second COMAL entity included in the COPAL product. A COMAL entity may include a plurality of COMAL entities. The UCE may be configured to assign a first processing node to a first COMAL entity included in the plurality based on the definitions associated with each of the other COMAL entities included in the plurality.

Apparatus and methods in accordance with this disclosure will now be described in connection with the figures, which form a part hereof. The figures show illustrative features of apparatus and method steps in accordance with the principles of this disclosure. It is to be understood that other embodiments may be utilized, and that structural, functional and procedural modifications may be made without departing from the scope and spirit of the present disclosure.

The steps of methods may be performed in an order other than the order shown and/or described herein. Method embodiments may omit steps shown and/or described in connection with illustrative methods. Method embodiments may include steps that are neither shown nor described in connection with illustrative methods. Illustrative method steps may be combined. For example, an illustrative method may include steps shown in connection with any other illustrative method.

Apparatus may omit features shown and/or described in connection with illustrative apparatus. Apparatus embodiments may include features that are neither shown nor described in connection with illustrative apparatus. Features of illustrative apparatus may be combined. For example, an illustrative apparatus embodiment may include features shown or described in connection with any other illustrative apparatus and/or method embodiment.

FIG. 1 shows schematics 100 for partial, in-memory entities and processor bot controllers. Schematics 100 includes illustrative COMAL entity definition 105. Definitions 105 show exemplary fields that may be used to define a COMAL entity. Definitions 105 include ruleset pointer 106. Ruleset pointer 106 may define how COMAL entity definition 105 may or may not be subject to a COMAL Linked Ruleset Definition 103 that applies to a plurality of COMAL entities. Schematics 100 also show that COMAL Linked Ruleset Definition 103 may only be valid for a subset of transactions 107.

Schematics 100 also shows COPAL processor template 101. Template 101 may be used to build a COPAL product based on one or more COMAL entities. For example, template 101 includes field 102 that shows a COPAL product may include all COMAL entities that are subject to a linked rule set definition, such as COMAL Linked Ruleset Definition 103.

Figure 2:
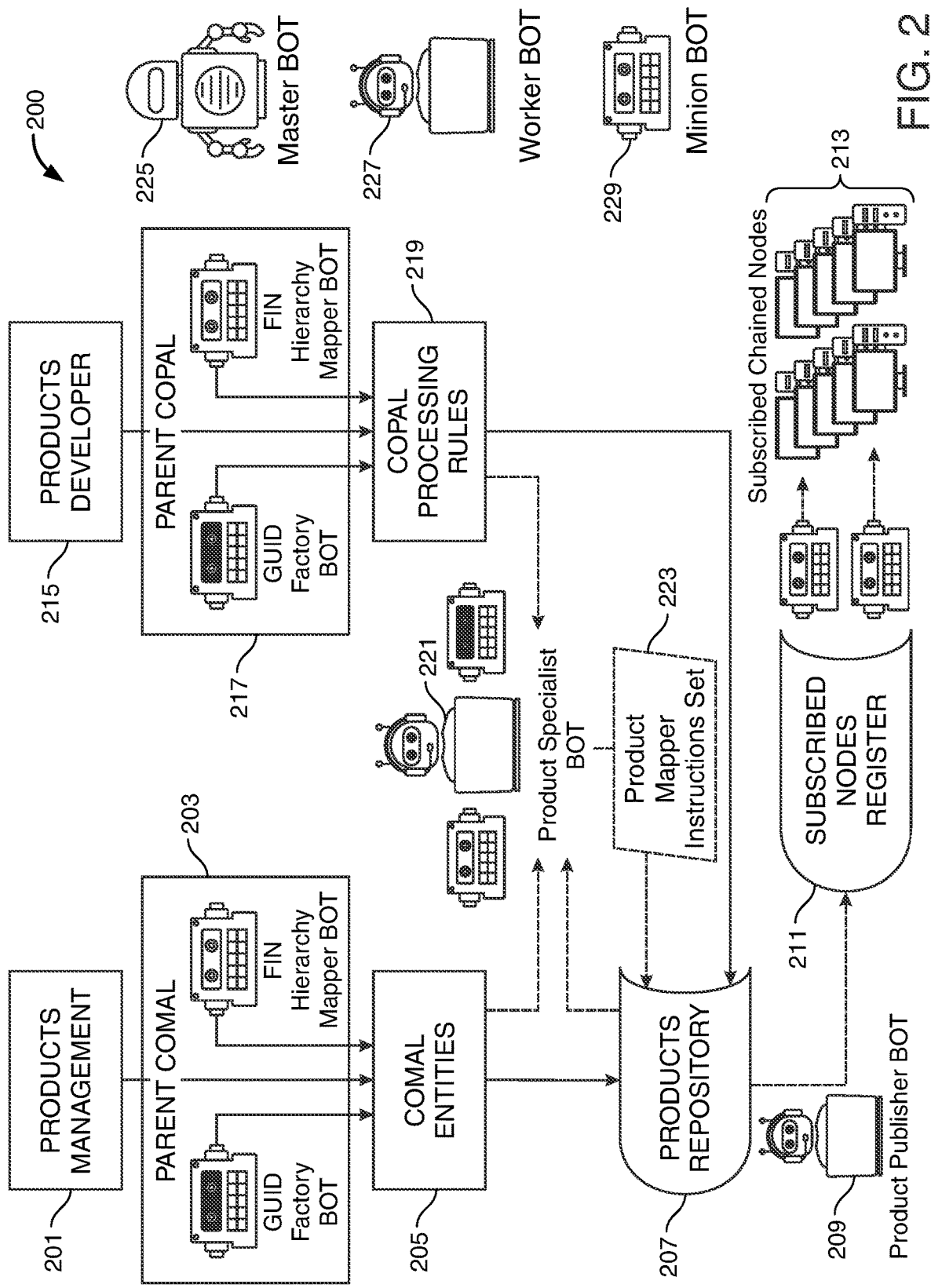
FIG. 2 shows an illustrative system in accordance with principles of the disclosure.

FIG. 2 shows illustrative process 200 for synthesizing a COPAL product based on one or more COMAL entities. Process 200 may be executed by an aggregating engine. The aggregating engine may execute COPAL to synthesize a product. The aggregating engine may synthesize the product based on two or more COMAL defined entities.

Process 200 includes product management subprocess 201. Subprocess 201 ensures that if a COPAL product includes multiple COMAL entities, each of the COMAL entities are compatible with each other. Subprocess 201 includes step 203. At step 203, automated software tools, such as bots, formulate and verify relationships among the COMAL entities.

For example, step 203 shows that a COPAL product may include a parent COMAL entity. The parent COMAL entity may include definitions that apply to all the other COMAL entities included in the COPAL product. For example, step 203 shows that the parent COMAL entity includes a unique identifier and a processing hierarchy map that will control processing by a UCE of each child COMAL entity included in the COPAL product.

Process 200 includes product development subprocess 215. Subprocess 215 builds a COPAL product based on one or more COMAL entities. Subprocess 215 includes step 217. At step 217, shows that a COPAL product may include a parent COPAL product. The parent COPAL product may include rules that control interaction among two or more COPAL products that are included in a parent COPAL product. For example, step 219 shows that the parent COPAL product includes a unique identifier and a processing hierarchy map that will control interaction among two or more child COPAL products.

Step 223 shows that after verifying the relationship between constituent COMAL entities and child COPAL products included in a parent COPAL product, a primary instruction set is generated for the parent COPAL product. For the parent COPAL product, the primary instruction set will control interaction among each child COPAL product and the COMAL entities included in each child COPAL product.

Step 205 shows that the COMAL entities that will be included in a COPAL product and then gathered by the bots and are stored in products repository 207. After all the COMAL entities associated with a COPAL product are in products repository 207, at step 209, the COPAL product is processed by register 211. Register 211 provides an interface between a COPAL product and processing nodes 213 that will process the COMAL entities included in the COPAL product.

Each of processing nodes 213 may be associated with a different business unit and will identify themselves to register 211. One or more of processing nodes 213 will validate and check whether a data parameter is valid for a given COMAL entity. Register 211 also monitors which of processing nodes 213 are available (e.g., online) for processing a COPAL product bound to one or more data parameters.

Whenever a new COPAL product is published or definitions of a COMAL entity are changed, the available processing nodes 213 for the corresponding business unit will receive an immediate update (e.g., a push) so that the processing nodes 213 apply updated definitions for the COMAL entities included in any COPAL product. After being bound to data parameters, a published COPAL product is then pushed to processing nodes 213. Register 211 may also be configured to route a sub-transaction (e.g., a COMAL entity) to a relevant processing node for processing the data parameter bound to the COMAL entity.

Processing nodes 213 may include primary node 225, worker node 227 and minion node 229. Primary node 225 may receive a parent COPAL product and split the parent COPAL product into two or more child COPAL products. Worker node 227 may then split each child COPAL product into its constituent COMAL entities. Minion node 229 may then process each of the constituent COMAL entities in connection with any data parameter that was received in connection with the parent COPAL product.

Figure 3:
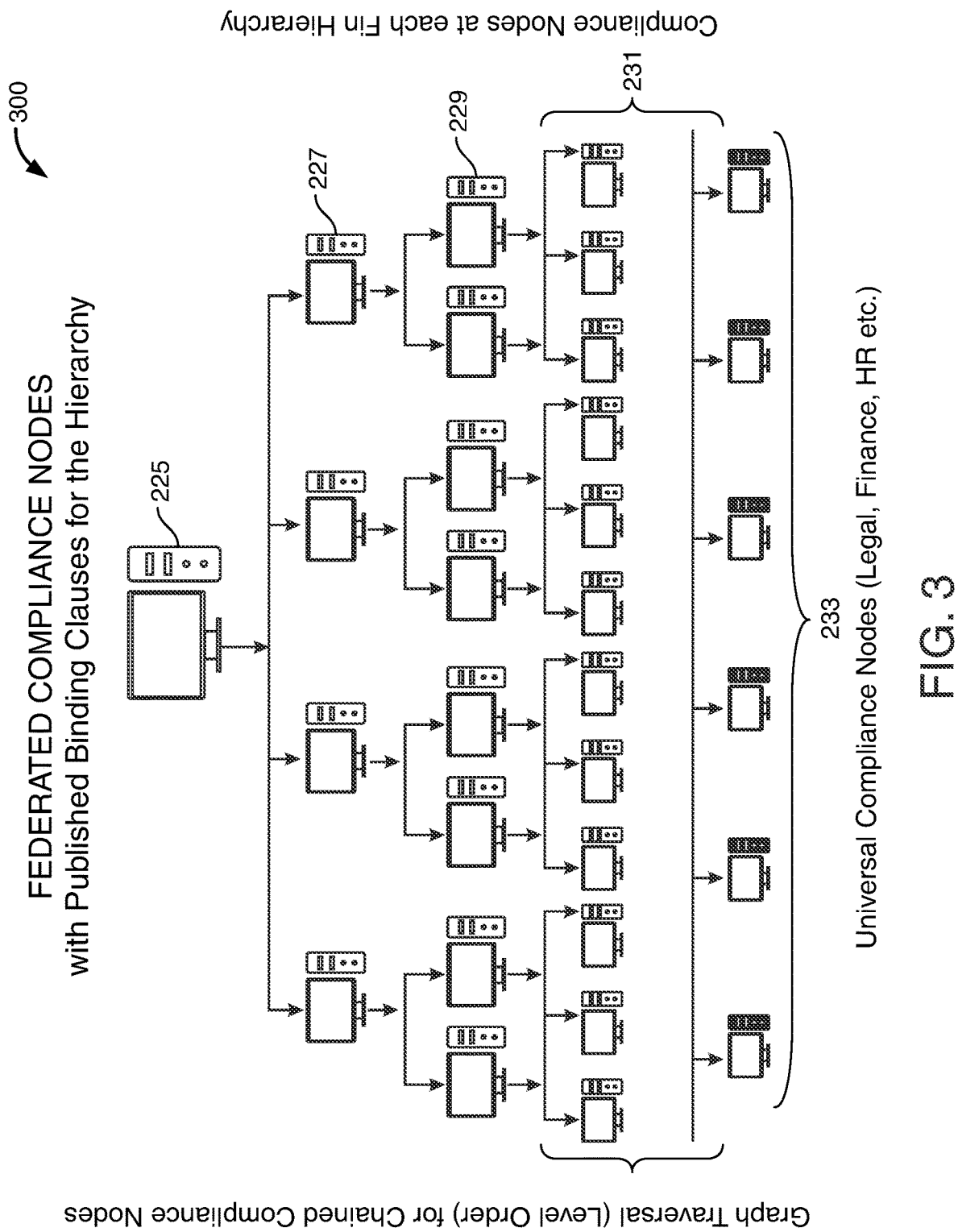
FIG. 3 shows an illustrative system in accordance with principles of the disclosure.

FIG. 3 shows illustrative detail 300 associated with processing nodes 213 shown in FIG. 2. FIG. 3 shows a processing hierarchy associated with processing nodes 213. Primary node 225 may split up a parent COPAL product into multiple child COPAL products. Hierarchy 300 shows that each of the child nodes may be processed in parallel by worker nodes 227. Each worker node 225 may split a child COPAL product into constituent parent COMAL entities. Each of the parent COMAL entities may be processed in parallel by minion nodes 229. Each minion node 229 may split each parent COMAL entity into its constituent child COMAL entities. Each child COMAL entity may be processed in parallel by nodes 231.

FIG. 3 also shows that hierarchy 300 may include universal compliance nodes 233. Universal compliance nodes 233 may process universal COMAL entities that apply to each COPAL product. Illustrative universal COMAL entities may ensure that a COPAL product complies with applicable legal, finance or human resources rules and regulations.

Figure 4:
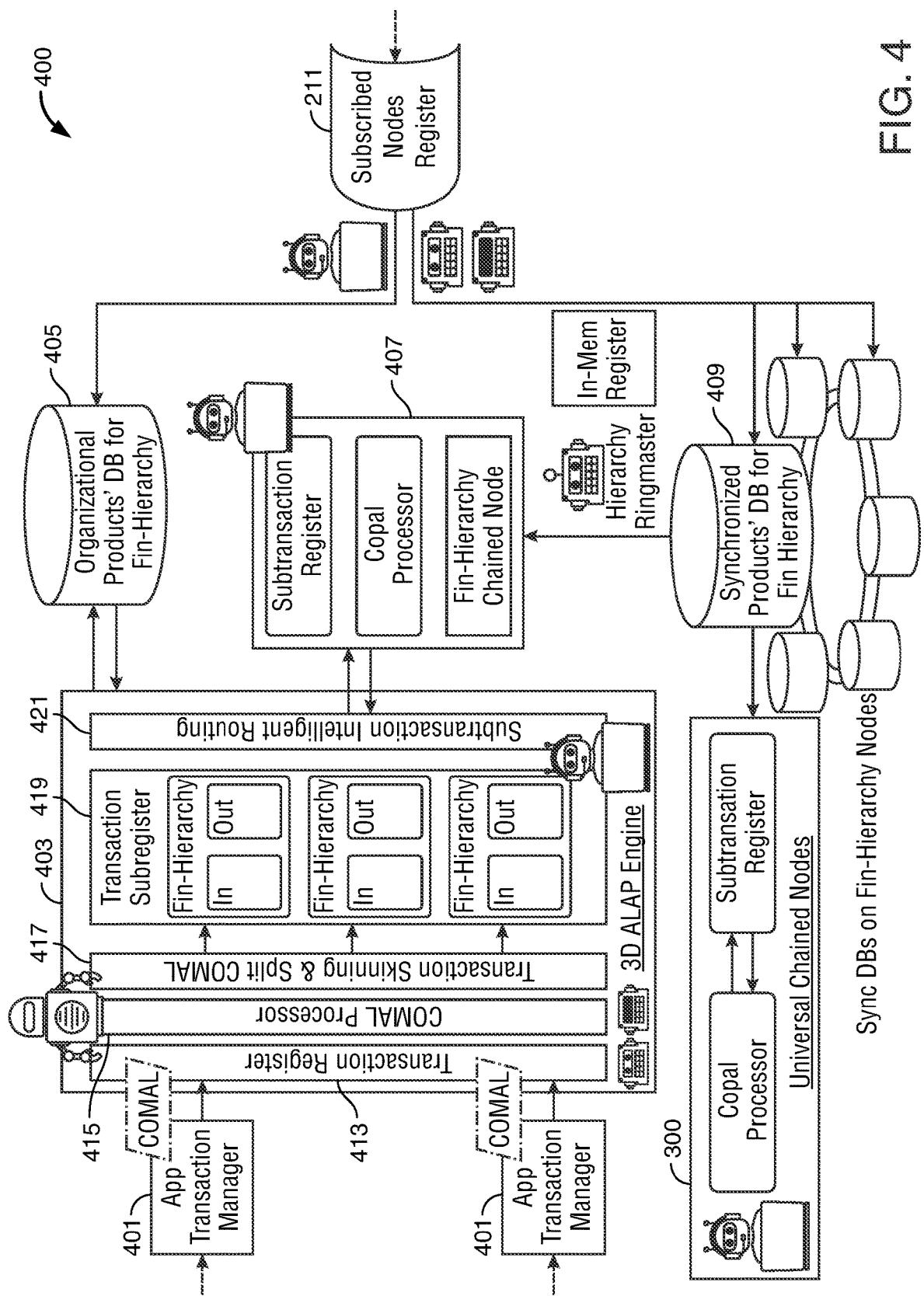
FIG. 4 shows an illustrative system in accordance with principles of the disclosure.

FIG. 4 shows illustrative process 400 in connection with operation of aggregating engine 403. Process 400 shows that transaction application managers 401 may receive COPAL products and bind those COPAL products to one or more data parameters. The received COPAL products and data parameters are transferred to transaction register 413 aggregating within engine 403. Transaction register 413 confirms that the data parameters are validly associated with one or more of linked transactions 107 (shown in FIG. 1).

Next, COMAL processor 415 identifies the various constituent COMAL entities that may be included in a COPAL product. Transaction "skinning" module 417 splits the discrete COMAL entities and submits each constituent COMAL entity to transaction sub-register 419. Transaction sub-register 419 interacts with COPAL processing module 407 to determine a role of each constituent COMAL entity in determining functionality or purpose of a COPAL product.

Aggregating engine 403 may access database 405 to determine a processing hierarchy for the constituent COMAL entities included in a COPAL product. Database 405 may define different processing hierarchies for the same COMAL entities when utilized by different business units for different COPAL products.

COPAL processing module 407 may access COPAL products database 409 to confirm that a COPAL product includes each of its constituent COMAL entities. FIG. 4 shows that register 211 (shown in FIG. 2) may track published COPAL products published by different business units, which may be stored in databases 405 and 409. After successfully confirming the that a COPAL product includes each of its constituent COMAL entities and a processing hierarchy for the constituent COMAL entities, the constituent COMAL entities are passed to hierarchy 300 and associated nodes for processing in connection with the received data parameters.

Figure 5:
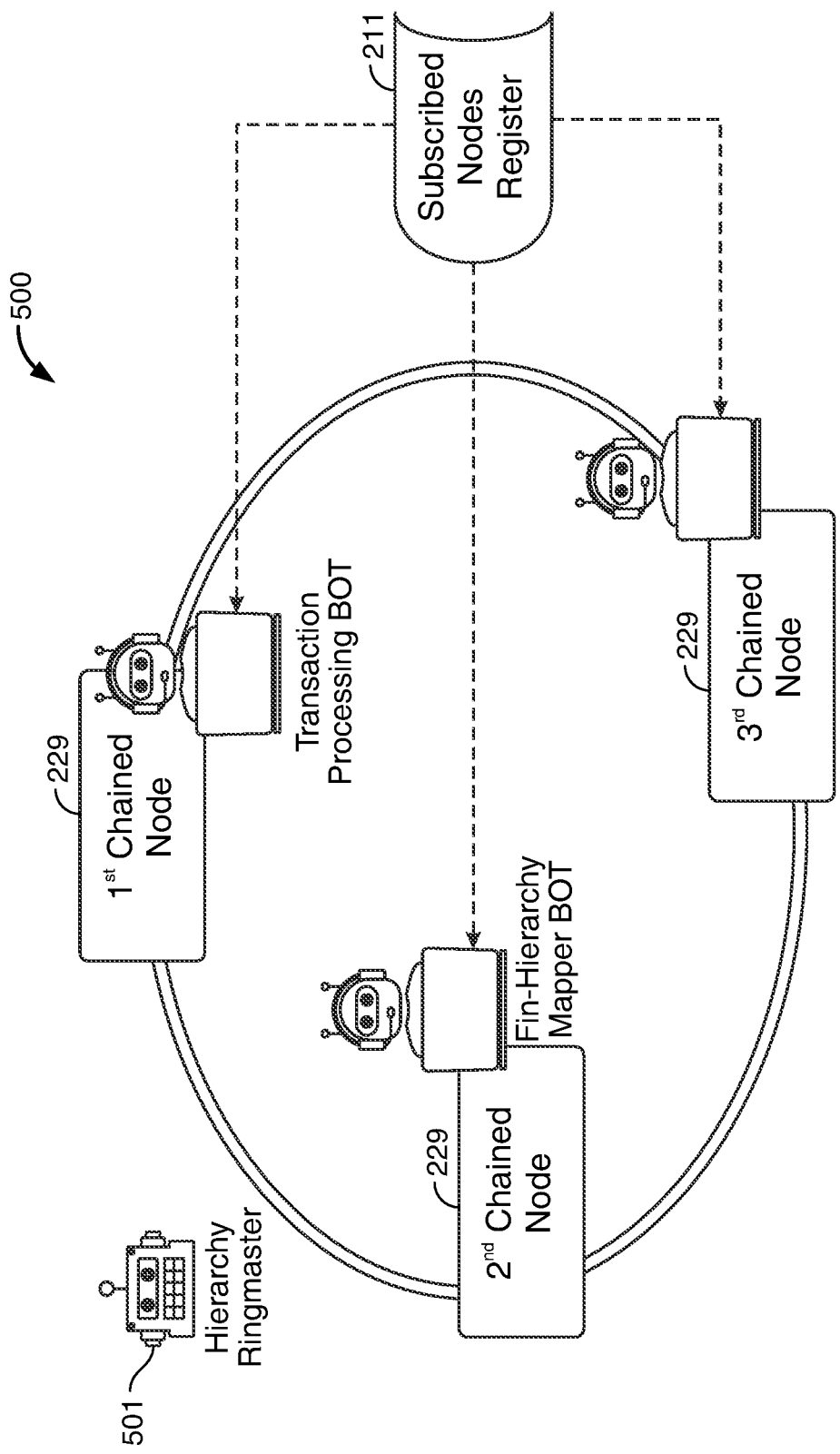
FIG. 5 shows an illustrative system and associated process in accordance with principles of the disclosure.

FIG. 5 shows illustrative architecture 500 for managing hierarchical processing of a COPAL product. Architecture 500 includes hierarchy control node 501. Hierarchy control node 501 tracks the number of minion processing nodes 229 that are up and processing. For example, by tracking activity of minion processing nodes 229, hierarchy control node 501 may provide a load balancing function to the UCE. Hierarchy control node 501 may ensure that each minion node 229 is not overloaded with processing tasks.

Hierarchy control node 501 may channel a sub-transaction to the most suitable minion node 229 from those available. Hierarchy control node 501 may also coordinate use of two or more nodes minion 229 to each partial process a constituent COMAL entity included in a COPAL product.

Thus, methods and apparatus for HIERARCHICAL SOFTWARE PROCESSING USING FEDERATED NODES are provided. Persons skilled in the art will appreciate that the present disclosure can be practiced by other than the described embodiments, which are presented for purposes of illustration rather than of limitation, and that the present disclosure is limited only by the claims that follow.

What is claimed is:

1. A system architecture for generating a computer program, the system architecture comprising: a processor;
   a non-transitory computer-readable medium which contains instructions that when executed by the processor generates the computer program;
   a library of entities defined using a compliance objects metadata annotation language ("COMAL"), wherein the COMAL is configured to present onscreen visual cues, said visual cues defining a target entity;
      wherein the visual cues are configured to create processing rules and business logic for the target entity; and
      wherein, based on an arrangement of the visual cues, underlying software programs associated with the COMAL are configured to issue function calls creating and defining the target entity;
   an aggregating engine executing a compliance objects processing and analysis language ("COPAL") that synthesizes a product based on two or more COMAL entities; and
   a universal central engine that processes the product based on at least one target data parameter, said parameter that comprises an input tested for compliance with a definition of a COMAL entity, received for each COMAL entity synthesized in the product;
      wherein, the universal central engine further comprises a plurality of nested nodes, wherein each of the nested nodes processes one COMAL entity;
      wherein, the plurality of nested nodes comprises a higher-level node and a lower-level node; and
      the higher-level node processes a first COMAL entity before the lower-level node processes a second COMAL entity;

wherein the product comprises a COMAL entity and a COPAL product, the COPAL product corresponds to a purchase transaction, and the COPAL product comprises a combination of a credit card COPAL product, a point-of-sale ("POS") terminal COPAL product, and a transaction COPAL product; and wherein a change to any COMAL entity included in the library is applied to any product that includes the COMAL entity.

2. The system architecture of claim 1 wherein the library of COMAL entities includes physical entities, digital entities, infrastructure entities, process entities, and human resource entities.

3. The system architecture of claim 1 wherein a definition of each COMAL entity synthesized in the product is applied after the at least one target data parameter is bound to the COMAL entity.

4. The system architecture of claim 1 wherein, a failure of the higher-level node when processing the first COMAL entity aborts any further processing of the second COMAL entity.

5. The system architecture of claim 1, wherein:
the library of COMAL entities is linked to a target identifier; and
the definition of each COMAL entity in the library prevents a synthesis of a product using a foreign COMAL entity that does not include the target identifier.

6. The system architecture of claim 1, wherein:
the product is a first product associated with a first plurality of COMAL entities; a second product is associated with a second plurality of COMAL entities; and
the aggregating engine creates a third product by synthesizing the first product and the second product.

7. The system architecture of claim 1, wherein:
the product comprises a first COMAL entity and a second COMAL entity; and
the at least one target data parameter comprises a third COMAL entity.

8. A method for building and executing software applications, the method comprising:
using a compliance objects metadata annotation language ("COMAL") defining a first COMAL entity and a second COMAL entity, wherein the first COMAL entity and the second COMAL entity are designed to present onscreen visual cues, said visual cues configured to define a target entity;
wherein the visual cues are configured to create processing rules and business logic for the target entity; and
wherein, based on an arrangement of the visual cues, a plurality of underlying software programs are configured to issue function calls creating and defining the target entity;
executing a Compliance Objects Processing and Analysis Language ("COPAL") and synthesizing a product based on the first COMAL entity and the second COMAL entity, the product processed based on at least one target data parameter, said parameter that comprises an input tested for compliance with a definition of a COMAL entity, received for each COMAL entity synthesized in the product;
receiving a first data parameter associated with the first COMAL entity and a second data parameter associated with the second COMAL entity; and processing the product, using a universal central engine, by applying, in parallel, the first data parameter to the first COMAL entity and the second data parameter to the second COMAL entity;
wherein, the universal central engine further comprises a plurality of nested nodes, wherein each of the nested nodes processes one COMAL entity;
wherein, the plurality of nested nodes comprises a higher-level node and a lower-level node; and
the higher-level node processes a first COMAL entity before the lower-level node processes a second COMAL entity;
wherein the product comprises a COMAL entity and a COPAL product, the COPAL product corresponds to a purchase transaction, and the COPAL product comprises a combination of a credit card COPAL product, a point-of-sale ("POS") terminal COPAL product, and a transaction COPAL product; and
wherein a change to any COMAL entity included in the library is applied to any product that includes the COMAL entity.

9. The method of claim 8 further comprising processing the product in parallel by:
detecting the first COMAL entity and the second COMAL entity in the product; and
assigning the first COMAL entity to a first processing node and the second COMAL entity to a second processing node.

10. The method of claim 9 further comprising processing the product in parallel by:
detecting a first COMAL sub-entity embedded in the first COMAL entity and a second COMAL sub-entity embedded in the first COMAL entity; and
using the first processing node, processing the first COMAL sub-entity using a first sub-node and processing the second COMAL sub-entity using a second sub-node.

11. The method of claim 9 further comprising:
using the COMAL, changing to the definition of the first COMAL entity after the synthesizing; and
processing the product by applying the changed definition of the first COMAL entity.

12. The method of claim 8 wherein synthesizing the product occurs after the first COMAL entity is associated with the first data parameter and after the second COMAL entity is associated with the second data parameter.

13. A system architecture for processing computer code, the system architecture comprising:
a processor;
a non-transitory computer-readable medium which contains machine executable instructions that when executed by the processor processes the computer code;
a compliance objects metadata annotation language ("COMAL"), the COMAL entity is configured to present onscreen visual cues, said visual cues defining a target entity;
wherein the visual cues are configured to create processing rules and business logic for the target entity; and
wherein, based on an arrangement of the visual cues, underlying software programs associated with the COMAL are configured to issue function calls creating and defining the target entity:
an aggregating engine executing a compliance objects processing and analysis language ("COPAL") that synthesizes a product based on a first COMAL entity and a second COMAL entity; and a universal central engine ("UCE") that processes the product based on at least one target data parameter, said parameter that comprises an input tested for compliance with a definition of a COMAL entity, received for each COMAL entity synthesized in the product, the UCE comprising the machine executable instructions, that when executed by the processor on a computer system:

receives the COPAL product bound to a first data parameter and a second data parameter;

splits the COPAL product into the first COMAL entity and the second COMAL entity;

assigns a first node to process the first data parameter in connection with the first COMAL entity; and assigns a second node to process the second data parameter in connection with the second COMAL entity;

wherein, the universal central engine further comprises a plurality of nested nodes, wherein each of the nested nodes processes one COMAL entity;

wherein, the plurality of nested nodes comprises a higher-level node and a lower-level node; and the higher-level node processes a first COMAL entity before the lower-level node processes a second COMAL entity;

wherein the product comprises a COMAL entity and a COPAL product, the COPAL product corresponds to a purchase transaction, and the COPAL product comprises a combination of a credit card COPAL product, a point-of-sale ("POS") terminal COPAL product, and a transaction COPAL product; and wherein a change to any COMAL entity included in the library is applied to any product that includes the COMAL entity.

14. The system architecture of claim 13, further comprising a transaction application manager that binds the first data parameter to the first COMAL entity and the second data parameter to the second COMAL entity.

15. The system architecture of claim 13, wherein:
the UCE comprises a plurality of nodes and a hierarchy control application; and
the hierarchy control application coordinates assignment of the first node to the first COMAL entity and the second node to the second COMAL entity based on a real-time processing workload of other nodes in the plurality.

16. The system architecture of claim 15, wherein the hierarchy control application is configured to assign the first node to the first COMAL entity based on a definition of the first COMAL entity.

17. The system architecture of claim 13, wherein:
the first COMAL entity comprises a plurality of COMAL entities; and
the UCE is configured to assign the first node to the first COMAL entity based on definitions associated with each of the plurality of COMAL entities.

* * * * *